June 26, 1956 J. A. DUNHAM 2,752,094
AIR SAMPLING TEMPERATURE CONTROL SYSTEM
Filed Oct. 1, 1952

James A. Dunham
INVENTOR.

BY
HIS PATENT AGENT.

United States Patent Office 2,752,094
Patented June 26, 1956

2,752,094

AIR SAMPLING TEMPERATURE CONTROL SYSTEM

James A. Dunham, Burbank, Calif., assignor to North American Aviation, Inc.

Application October 1, 1952, Serial No. 312,605

8 Claims. (Cl. 236—1)

My invention relates to temperature control and more particularly to a system automatically operable to maintain the temperature in an enclosed space within a prescribed range.

There are many installations wherein it is necessary to maintain supplies or equipment within a certain favorable temperature range and where such installation is made in aircraft, which in normal operation are subjected to a wide variation in ambient temperatures, the difficulties involved in providing an effective system capable of holding the desired installation temperature within the required narrow range are magnified. By way of illustrating the problem with a specific example, consideration may be given to the requirement in military aircraft of maintaining an ammunition supply so that the temperature of the powder mass in each cartridge shall be held substantially constant at the optimum temperature level. A typical specification might require the maintenance of temperature in a 25 degree range between 35° F. and 60° F. with the outside air temperature at the —65° level. To accomplish this it is necessary to supply the proper quantity of heat at a rate to hold the ammunition temperature always within the 25° range. The supplying means must have ample heat capacity to do this and at the same time there must be sensitive control or regulation of the heat flow so that underheating or overheating will not occur even though external temperature changes may occur rapidly. And, of course, when the ammunition temperature rise approaches the level of 60° F., then tempering of the airflow by admixture with cooler air is required to maintain the ammunition temperature below 60°.

Thus the principal object of this invention is to provide a temperature control system capable of supplying heat at a rapid rate under a sensitive control that can rapidly respond to changing temperature conditions before they effect a complete change of temperature in the controlled space and as a result act to increase or decrease the heat flow rate to maintain a preset temperature within narrow limits.

A further object is to provide a temperature control system that shall be capable of curtailing the temperature rise in case of overheat tendencies and that shall be automatic in operation so as not to require the attention of an operator.

Figure 1:
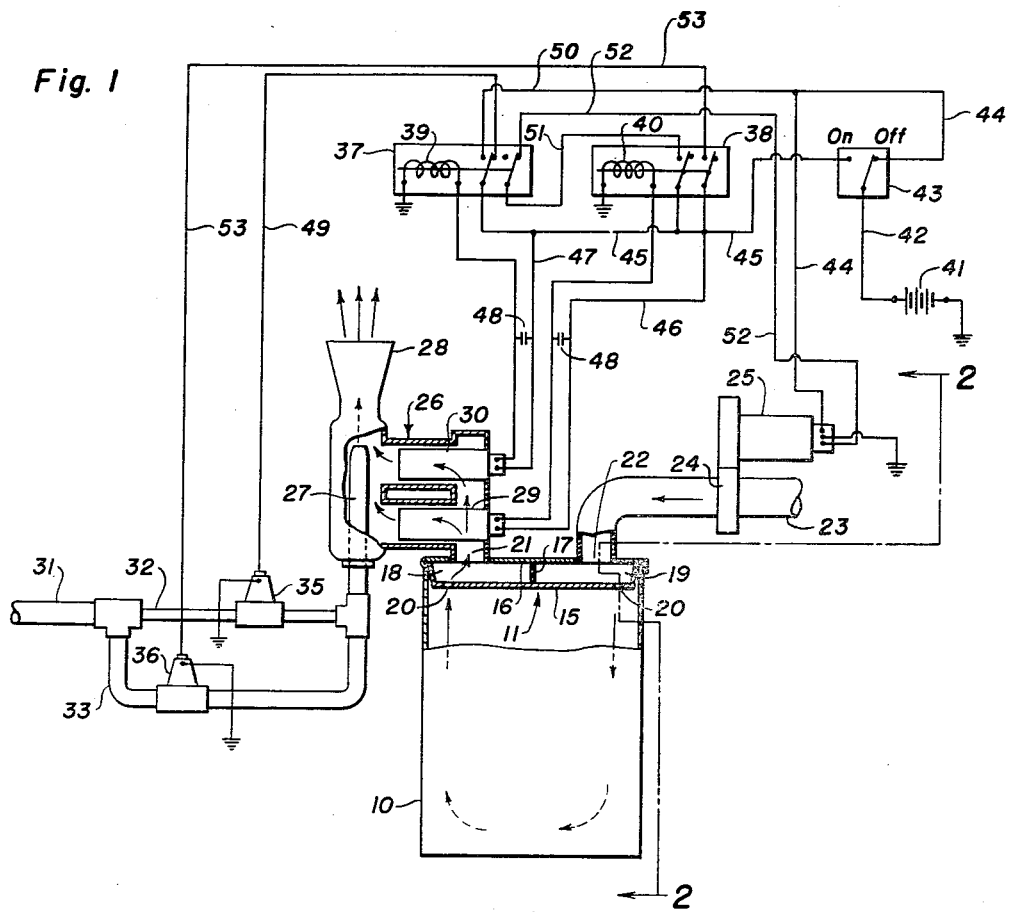
Figure 2:
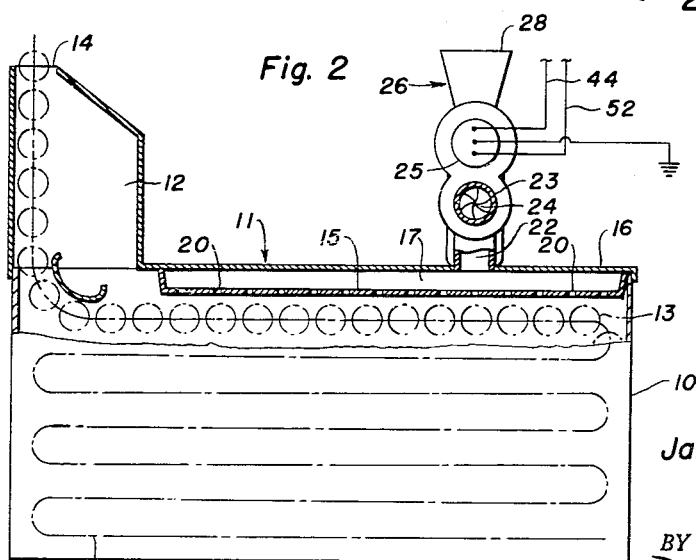

Additional objects and advantages will become apparent during consideration of the appended drawings and related description in which:

Figure 1 is a diagrammatic view of a temperature control system embodying my invention; and Figure 2 is a partial view in side elevation taken on the line 2—2 of Fig. 1.

The installation shown in the drawings comprises a control system for automatically maintaining a pre-set temperature within plus or minus limits in an ammunition storage container 10. Such a container is generally known in the art, being a rectangular box unit with a hinged cover 11 and having an outlet or feed chamber 12. Conventionally, a belt of linked cartridges, diagrammatically indicated at 13 in Figure 2, is looped back and forth within the box with the exposed end extending outwardly through the outlet slot 14 of chamber 12. With a belt of cartridges in the box, there are air spaces around the sides and ends of the cartridges as well as passages between adjacent cartridges so that there is opportunity for circulation of air and rapid equalization of temperature within the cartridge box.

In airplane installations, ammunition boxes are frequently installed in remote locations such as in outboard panels of the wings and are there exposed to the changes in temperature encountered by the airplane when operating in different regions and altitudes. However to ensure proper feed to the guns and maintain desired ballistic characteristics upon firing, it is necessary to keep the ammunition within a narrow range of a specified temperature. This is accomplished by my invention through the circulation of heating or cooling air through the ammunition box under precise regulation by the temperature of the air that is in contact with the ammunition. In order to facilitate the supply of heating air to the stored ammunition, the standard box has been modified to the extent of forming the cover 11 as a hollow member having a bottom surface 15 and a top surface 16 which with the side walls and ends forms a space divided by a longitudinally extending partition 17 into two compartments or manifolds 18 and 19. Both compartments are in communication with the main interior space of the box 10 through a series of apertures 20 formed in the bottom wall 15 of the cover 11. Also compartment 18 has an outlet port 21 while compartment 19 has a similar port 22 through which a heated and pressurized air flow is introduced to the chamber and from thence to the box interior so that it can flow over the ammunition and then exhaust through the chamber 12 and exit 14. Hot air from any suitable sources is supplied through conduit 23 to port 22 and the flow is controlled by a cut-off valve 24 operated by a reversible motor 25.

If it were not necessary to maintain the temperature substantially constant, it would be possible to control the valve 24 by any of the well known temperature regulators. In this case, however, known types have failed to meet the performance requirements and it was not until the subject apparatus was invented, that satisfactory temperature maintenance was achieved. This is accomplished by addition of an anticipator unit operated by a jet pump which is controlled in its operation in accordance with changing temperatures.

The jet pump anticipator unit is contained in a housing 26 having two inlets and an outlet. One inlet serves to introduce a jet of air under pressure which is released from the nozzle 27 within the housing in a portion 28 shaped as a venturi, the tail orifice of which serves as the air flow outlet for the jet pump casing 26. Also contained in the casing is a pair of thermo-switch units 29 and 30. These units are available on the market and being well known in the art, it is deemed sufficient to state that they function to open or close an electric circuit upon the attainment of a pre-set temperature. The thermo-switch 29 has contacts that are normally closed but which open when its temperature rises to the 35° F. level. On the other hand, the thermo-switch 30 is of the type that has normally open contacts set to close when its temperature rises to 60° F.

The jet pump casing is mounted on the box 10 so that its second inlet overlies the port 21 and has a fluid-tight connection therewith. The result of this construction is that with the jet pump in operation, a flow of air is inducted into the casing 26 through the port 21, from the chamber 18. This causes a corresponding flow from the interior of the box 10, through the perforations 20 into chamber 18. Thus a portion of the air which may be in or moving through the box to or from the ammunition outlet 14 will be diverted and caused to flow over the thermo-switches 29 and 30. At this point it should be noted that they are both mounted in the housing in spaced relation to each other and to the surrounding walls of the housing so that all of the air induced to flow through port 21 will pass over the surfaces of the thermo-switches in a thin film. Thus a sampling of the air in the box 10 is taken continuously and this continuous sample consists of a mixture of air taken at spaced locations along the length of the box, with some coming from near the outlet, some from intermediate points and some from near the inlet and it thus is normally representative of the average temperature level although any variations in the incoming or outgoing temperature levels will be quickly sensed in the sampling flow by the thermo-switches before the change has had an opportunity to diffuse through all of the cartridges in the box. Thus a sort of anticipator action occurs which provides a corrective action before the adverse change has persisted long enough to really change the space temperature to any great extent. This anticipator action may be intensified if instead of the regular spacing of the holes 20 as shown in the drawings an arrangement is adopted which has the ports near the inlet and outlet points only.

The compressed air for operating the jet pump may be drawn from any convenient source which in an airplane might be the compressor section of a turbo-jet propulsion unit. This might also be the source of the pressurized hot air supplied through pipe 23. At any rate the pressure air supply is available in supply pipe 31 which is divided into two branches 32 and 33 having different internal diameters. Branch 32 contains a solenoid operated valve 35 having a port size corresponding to that of the connected piping 32. A similar valve 36 is inserted in line 33 but has a correspondingly larger port size. Both valves are of the normally closed type which open when the actuating solenoid is energized.

The solenoids of valves 35 and 36, the contacts of thermo-switches 29 and 30 and the reversible valve operating motor 25 are linked together by suitable connectors to a pair of relays 37 and 38 which forms an automatically operable control system. The two relays are constructed identically with the operating coil 39 of relay 37 being connected in series with the contacts of thermo-switch 30 while operating coil 40 of the other is connected in series with the contacts of thermo-switch 29. A source of current in the form of a battery is shown at 41 and the lead 42 from this connects to the middle contact of a single pole, double-throw main switch 43. One of the two remaining contacts of this switch, that marked "Off," is connected by lead 44 to one winding of the motor 25, so that when the switch is moved to the "Off" position to shut-down the system, the motor wil be energized in proper direction to close valve 24 and thus prevent wastage of heated air or even overheating of the ammunition due to uncontrolled admission of hot air.

From the remaining contact of switch 43, being the one marked "On," a power lead 45 is run to one of the two switch arms on relay 37 and to both switch arms on relay 38. Two other connections are run from lead 45. One of these designated 46 connects to one contact of thermo-switch 29 while the second, designated 47, connects to thermo-switch 30. The contacts of each thermo-switch are bridged by a capacitor 48 which may preferably be of 0.1 mfd. capacity to minimize contact arcing and to control instability.

The power lead 45 running to one switch arm on relay 37, in the switch position shown in Figure 1, delivers current flow through lead 49 to solenoid operated valve 35 but when the relay is energized and the switch moved to its alternate position, then the flow will proceed through lead 50 to connected lead 44 and thence to motor 25 to cause closing of valve 24. Concerning relay 38, and in the switch position shown in Figure 1, both switches are on open circuit but when thermo-switch 29 closes at temperatures below 35° F. to energize coil 40, then the switches deliver current to leads 51 and 53. Lead 51 connects to the second switch on relay 37 and when this relay is not actuated, the current flows through lead 52 to motor 25 which drives the valve 24 toward open position. Also, regardless of the condition of relay 37, current flow can proceed through lead 53 to cause opening of solenoid operated valve 36.

The operation of the automatic air sampling temperature control system will now be described. Assuming that the system is not in operation and that the temperature of the air in the ammunition box and more particularly that in contact with the thermo-switches is somewhat below the 35° F. level, then upon throwing the control switch 43 to the "On" position, both solenoid valves 35 and 36 will open to allow high pressure air to flow through the nozzle 27 and establish a jet ejector action which will cause a high velocity air flow across the thermo-switches from the interior of the ammunition box. If perchance the ammunition temperature is below the 35° level, but because of radiation effects from equipment near the jet pump unit 26 or the ambient atmosphere, the temperature of the thermo-switch 29 is somewhat above 35°, then only the solenoid operated valve 35 will open. In this case the jet pump 26 will operate at its lowest rate but at the same time the cut-off valve 24 controlling the inflow of heated air to the ammunition box will not be operated to open position. In this case, the air flow drawn by the jet pump from the interior of the ammunition box will induce a flow inward as a replacement through the slot 14 and chamber 12 and the flow movement will pass over the cold ammunition and thence upward over the thermo-switch 29 cooling it down to below the 35° level, and at this level the contact therein will close and allow a current flow to the relay 38 so that the same will be actuated to cause opening of the solenoid operated valve 36 and also of the cut-off valve 24. The jet pump will now operate at its greatest effectiveness and will rapidly draw a representative sample of air from the ammunition compartment which quickly rises to the desired operating temperature. As soon as the 35° level is reached, the thermo-switch 29 will undergo an opening of its contacts so that the solenoid operated valve 36 will have its current supply interrupted and will automatically close but the control valve 24 will remain in the previously established open position and heated air will continue to flow into the interior of the ammunition box 10; the jet pump now operating at its lowest rate.

The temperature rise will thus continue and as soon as it reaches the 60° level, it will cause closing of the contacts of thermo-switch 30 which in turn will cause operation of the relay 37 to in turn cause the motor 25 to operate in direction to close the cut-off valve 24 and simultaneously the current flow to the solenoid operated valve 35 will be interrupted so that that valve will also close. As a result of this, there will be a loss of air velocity or flow across the thermo-switches since the jet pump will not be operating and this will entail a sudden drop in air temperature at the thermo-switches whereupon the contacts in thermo-switch 30 will immediately open which will interrupt the movement of the cut-off valve 24 toward closed position and, of course, the circuit to the solenoid operated valve 35 will again be re-established to re-establish operation of the jet pump at its lower rate. As soon as the temperature of the air flowing over the thermo-switches again reaches 60°, both valves 24 and 35 will again close and this cycle will be repeated in steps until the control system reaches a balanced condition in which the combination of heated air entering the ammunition box and the air already therein or which may be drawn in through the slot 14 is at a mixture temperature such that the contacts of thermo-switch 30 will remain opened with the jet pump 26 operating continuously on the compressed air flow through solenoid operated valve 35. In this operational condition, the cut-off valve 24 will be in a partially closed attitude to allow a reduced quantity of heated air to flow into the ammunition box which will be just sufficient to maintain the desired temperature of the compartment or the objects contained therein.

Should the system overcontrol on "valve closing" sequence, or should the heated compartment air temperature drop below the set point for the thermo-switch 29 for any reason, anticipation and follow-up control will be accomplished for re-heating the compartment as follows: When the air temperature drawn across the thermo-switch 29 drops to the 35° level, the contacts in this thermo-switch will close to cause operation of motor 25 in proper direction to further open the cut-off valve 24 and simultaneously the solenoid operated valve 36 will open throwing the jet pump into its high velocity operation to draw air across the thermo-switches. This air flow is drawn from the ambient atmosphere through the interior of the ammunition box and partly from the hot air supply if the valve 24 is partly opened. If the temperature of this mixed air is above the set point of thermo-switch 29, its contact will again open thereby stopping the valve travel caused by motor 25 and simultaneously will cause closing of the solenoid operated valve 36. Here again, this cycle is repeated in steps until the system is satisfied by the temperature of the mixed air drawn across the thermo-switch remaining at or above its set point with the jet pump operating continuously on air supplied by the solenoid operated valve 35. If the system has overcontrol in this "valve opening" sequence or if due to a rise in ambient air temperatures or any other reason the temperature in the heated compartment rises above the desired value, air drawn across the thermo-switch 30 at or above its set point will again start a "valve closing" sequence.

The timing for valve opening or closing cycles is not necessarily critical for this system but if it is desired to hold temperature overshoot or undershoot in the heated compartment to a minimum, an actuator having a relatively fast time cycle for valve travel from open to closed positions or vice versa is desirable. A valve having a ten second operating cycle has been found to be extremely satisfactory. A fast actuator will produce a supply air flow change at the control valve of a greater magnitude in a given interval of time than a slow actuator. The more pronounced the supply air flow change, the more pronounced will be the temperature change at the temperature sensing thermo-switches and the control is then able to modulate for the desired ammunition box temperature in control steps which maintain the desired temperature level with but a negligible temperature variation occasioned by changing conditions.

The system has been described as employing thermo-switches having a definite pre-set temperature response level. However, the system may be adapted for operation over a variable range by utilizing temperature responsive devices which can be remotely adjusted. Also, if less precise regulation is desired, it would be possible to operate the system using only one speed of operation of the jet pump 26 by eliminating the branch pipe line 33 and the solenoid operated valve 36 associated therewith. It should also be noted that a system of this type may also be used to regulate the temperature within any enclosure and so is not limited to the described use with ammunition containers. It is obvious that these and similar changes not specified may be made in the details of the construction and the combination and arrangement of parts without departing from the spirit of the invention which has been described with a certain degree of particularity by way of example and to comply with the statutes and, accordingly, it is intended that all such changes should remain within the scope of this invention as hereinafter claimed.

I claim:

1. In an air sampling temperature control system for an enclosed space, means for introducing a supply of conditioning air thereto including an adjustable valve, apparatus including a dual speed jet pump in communication with the enclosed space arranged to induce a sampling flow of air outwardly therefrom into the apparatus, temperature sensitive units disposed to be contacted by the sampling flow of air, one of said temperature sensitive units being adapted to respond to a lower temperature limit and another of said temperature units being set to respond to an upper temperature limit and mechanism controlled by the temperature sensitive units adapted to operate the jet pump at its higher speed when the temperature is below the lower limit and to regulate the setting of the adjustable valve to compensate for temperature variations occurring within the enclosed space.

2. In an air sampling temperature control system for an enclosed space, means for introducing a supply of conditioning air thereto including an adjustable valve, an anticipator unit including a jet pump organized to be operated at different pumping rates, the said pump having fluid connection to the enclosed space whereby it is adapted to induce a sampling flow of air therefrom into the anticipator unit, temperature sensitive units disposed to be bathed in the sampling flow of air, one of said temperature units being adapted to respond to a lower temperature limit and another of said temperature units being set to respond to an upper temperature limit, a reversible motor connected to operate the adjustable valve and an operating electric circuit interconnecting the temperature sensitive units, means for controlling the pumping rate of the jet pump and the reversible motor organized to open the valve when the temperature is below the upper limit and to shut it when the temperature goes above while operating the jet pump at maximum rate except when the temperature rises above the lower limit.

3. In an air sampling temperature control system for an enclosed space, means for introducing a supply of conditioning air thereto, apparatus including a variable speed pump in communication with the enclosed space arranged to induce a sampling flow of air outwardly therefrom into the apparatus, temperature sensitive units disposed to be contacted by the sampling flow of air, one of said temperature sensitive units being adapted to respond to a lower temperature selected from a range of temperature based on 35° F. as the mean temperature and another of said temperature sensitive units being set to respond to an upper temperature selected from a range of temperatures having 60° F. as the mean temperature and mechanism controlled by the temperature sensitive units adapted to operate the said pump at a higher speed when the temperature is below the set point of the first said temperature sensitive unit and at a lower speed when the temperature of the sample air lies between the set points of the two said temperature sensitive units.

4. In an air sampling temperature control system for an enclosed space, means for introducing a flow of conditioned air into the space, an anticipator unit including a jet pump connected to induce a sampling flow of air from said space into said anticipator unit, means for supplying a separate flow of working fluid to the jet pump, detector elements located within the anticipator unit adapted to be responsive to changing conditions of the air in contact therewith, passageways through the anticipator unit adapted to conduct the flow of sampling air to the detector elements and the jet pump and to thereafter convey the flow to an external exhaust port, and mechanism controlled by the detector elements including separate regulating units adapted to vary the flows of conditioned air into the enclosed space and of working fluid to the jet pump.

5. In a temperature control system for an enclosed space, means for introducing a supply of conditioning medium thereto, apparatus including a variable speed pump in communication with the enclosed space arranged to induce a sampling flow of medium outwardly therefrom into the apparatus, temperature sensitive units disposed to be contacted by the sampling flow of medium, one of said temperature sensitive units being adapted to respond to a lower temperature selected from a range of temperatures based on 35° F. as a mean temperature and another of said temperature sensitive units being set to respond to an upper temperature selected from a range of temperatures having 60° F. as the mean temperature, and mechanism controlled by the temperature sensitive units adapted to operate the said pump at a predetermined speed when the temperature is below the set point of the first said temperature sensitive unit and at a different speed when the temperature of the sampling air lies between the set points of the two said temperature sensitive units.

6. In a conditioning system for an enclosed space, means for introducing a supply of conditioning medium thereto including an adjustable valve, apparatus including a variable speed pump in communication with the enclosed space arranged to induce a sampling flow of medium outwardly therefrom into the apparatus, condition sensitive units disposed to be contacted by the sampling flow of medium, one of said condition sensitive units being adapted to respond to one predetermined condition limit and another of said condition sensitive units being adapted to respond to a different predetermined condition limit, and mechanism controlled by the condition sensitive units adapted to operate the pump at a predetermined speed under control of one of said condition sensitive units and to regulate the setting of the adjustable valve to compensate for variations of the state of the conditioning medium occurring within the enclosed space.

7. In an atmosphere sampling type control system for an enclosed space, means for introducing a flow of conditioning medium into the space, apparatus including a variable speed pump in communication with the enclosed space arranged to induce a sampling flow of atmospheric medium outwardly therefrom into the apparatus, condition sensitive units disposed in the apparatus to be contacted by the sampling flow of medium, one of said condition sensitive units being set to respond to a predetermined condition state, and another of said condition sensitive units being set to respond to a different predetermined condition state, and mechanism controlled by the condition sensitive units adapted to operate the pump at one speed when the condition of the medium lies within the range established by the predetermined condition states as limits and to operate the pump at a different speed at other times.

8. In a control system for maintaining predetermined atmospheric conditions in an enclosed space, means for introducing a flow of conditioning medium into the space including an adjustable valve, an anticipator including a medium sampling chamber, conduit means interconnecting the said space to the interior of said chamber, a variable flow rate pump arranged to induce a sampling flow of medium through said conduits, condition sensitive units located within the anticipator adapted to respond to changing conditions in the medium in contact therewith, one of the condition sensitive units being set to respond to a predetermined limit condition, another of said condition sensitive units being set to respond to a different predetermined limit condition, and mechanism controlled by the condition sensitive units adapted to operate the pump at one flow rate while adjusting the valve to open position under control of the first condition sensitive unit and to operate the pump at another flow rate while adjusting the valve to closing position under control of the second specified condition sensitive unit.

References Cited in the file of this patent

UNITED STATES PATENTS

| | | |
|---|---|---|
| 922,783 | Korting | May 25, 1909 |
| 1,022,188 | Geissinger | Apr. 2, 1912 |
| 2,495,861 | Newton | Jan. 31, 1950 |
| 2,523,497 | Copping | Sept. 26, 1950 |
| 2,537,315 | Newton | Jan. 9, 1951 |
| 2,599,569 | McLarty | June 10, 1952 |